United States Patent

Hashimoto et al.

[11] Patent Number: 5,783,922
[45] Date of Patent: Jul. 21, 1998

[54] ROBOT CONTROLLER PERMITTING LEAD-THROUGH TEACHING

[75] Inventors: Yoshiki Hashimoto, Hadano; Yoshikiyo Tanabe, Fujiyoshida, both of Japan

[73] Assignee: Fanuc Ltd., Yamanashi, Japan

[21] Appl. No.: 817,717

[22] PCT Filed: Aug. 26, 1996

[86] PCT No.: PCT/JP96/02379

§ 371 Date: Apr. 24, 1997

§ 102(e) Date: Apr. 24, 1997

[87] PCT Pub. No.: WO97/07941

PCT Pub. Date: Mar. 6, 1997

[30] Foreign Application Priority Data

Aug. 25, 1995 [JP] Japan ................... 7-239044

[51] Int. Cl.⁶ .................. G05B 19/00; B25J 9/22
[52] U.S. Cl. .................. 318/568.14; 318/568.13; 318/568.11; 395/84; 395/99; 901/7; 901/9
[58] Field of Search ............... 318/560–696; 395/80–99; 364/474.11, 134; 901/7, 9; 200/5 R, 52 R, 1 V

[56] References Cited

U.S. PATENT DOCUMENTS

| | | | |
|---|---|---|---|
| 5,032,975 | 7/1991 | Yamamoto et al. | 364/134 |
| 5,115,179 | 5/1992 | Fujii et al. | 318/568.13 |
| 5,136,222 | 8/1992 | Yamamoto et al. | 318/568.2 |
| 5,212,433 | 5/1993 | Yasuyuki | 318/568.13 |
| 5,389,865 | 2/1995 | Jacobus et al. | 318/568.11 |
| 5,459,382 | 10/1995 | Jacobus et al. | 318/568.11 |
| 5,617,515 | 4/1997 | MacLaren et al. | 395/99 |
| 5,629,594 | 5/1997 | Jacobus et al. | 318/568.11 |
| 5,705,906 | 1/1998 | Tanabe et al. | 318/568.13 |

FOREIGN PATENT DOCUMENTS

| | | |
|---|---|---|
| 64-87174 | 3/1989 | Japan. |
| 2-83185 | 3/1990 | Japan. |
| 6-80587 | 11/1994 | Japan. |

*Primary Examiner*—Paul Ip
*Attorney, Agent, or Firm*—Staas & Halsey

[57] ABSTRACT

A robot controller capable of performing the lead-through-teaching easily and safely. When an operator depresses a lead-through-teach enabling switch (12) provided at a main body of a control apparatus, power supply to a servo control unit (17) is stopped and mechanical brakes (18) are set effective. When a deadman switch (4) is depressed by the operator holding a teaching handle (3), an electromagnetic relay RL1 is energized and a normally-open contact (14) is closed. Consequently, the mechanical brakes (18) are rendered ineffective and an electromagnetic relay RL2 is energized to close a normally-open contact (15), whereby electric power is supplied to the servo control unit (17). Further, a signal for setting a torque command to zero is inputted to the servo control unit. Thus, the operator can move the robot in a desired direction. When the operator stops depressing the deadman switch (4), the mechanical brake is immediately set effective to lock the robot at its current position.

3 Claims, 2 Drawing Sheets

ROBOT CONTROLLER PERMITTING LEAD-THROUGH TEACHING

TECHNICAL FIELD

This application is a 371 of PCT/JP96/02379 filed Aug. 26, 1996. The present invention relates to a control apparatus for an industrial robot, and more particularly, to a robot controller for improving safety of an operator in performing a lead-through teaching operation.

BACKGROUND ART

A small-sized robot and a robot having a balanced structure with respect to gravity (e.g., painting robots) often employ a teaching method in which an operator operates the robot by holding and moving a teaching handle mounted on a hand portion of a robot to thereby teaching the robot, and this method is called lead-through teaching. The following two method are known as the lead-through teaching.

(1) A method in which mechanical and dynamic brakes are made ineffective and a torque command for a servo control unit for drive motors of robot axes is set to zero by software processing while the servo control unit is kept in an operative state, to thereby enable the lead-through teaching.

(2) A method in which the servo control unit for the drive motors of the robot axes is set in an inoperative state by outputting an emergency stop signal and the mechanical brakes are released, to thereby enable the lead-through teaching.

However, in the method (1) where the servo control unit is kept ON, since the teaching handle is not provided with means i.e. an enable device for immediately and surely stopping the robot on an occasion where the robot makes an unexpected motion due to an erroneous operation of the servo control unit in the operative state, the operator cannot promptly cope with such an unexpected motion of the robot.

In the method (2) where the teaching operation is carried out while effecting the emergency stop, the unexpected motion of the robot resulting from an erroneous operation of the servo control unit can be prevented, but since the dynamic brakes of servomotors are automatically set effective by outputting the emergency stop signal, the operator is required to exert a great force to move the robot to be burdened with a heavy load in the lead-through teaching. To solve this problem, it is necessary to provide an additional circuit for electrically disconnecting the dynamic brakes from the servomotors in the lead-through-teaching to thereby make the dynamic brakes ineffective and also setting the servomotors inoperative, to cause an increase of cost.

Furthermore, according to the conventional methods, as the brakes remain released all the time in the lead-through-teaching, a robot having an imbalanced structure with respect to gravity will cause such problem that the robot arm greatly declines downward due to gravity when the operator releases the teaching handle.

DISCLOSURE OF INVENTION

An object of the present invention is to provide a robot controller permitting an operator to perform a lead-through teaching easily and safely.

According to the present invention, an enable device of a deadman switch is provided on a teaching handle, thereby permitting the operator to stop the robot at any time.

A robot controller of the present invention comprises a main body having a servo control unit for controlling respective robot axes and a power source for supplying electric power to the servo control unit, and a lead-through-teach control circuit.

The lead-through-teach control circuit includes a servo on/off switching means for switching on and off the power supply from the power source to the servo control unit, a brake switching signal output means for outputting a signal for switching the mechanical brake to be effective/ineffective, the deadman switch provided on the teaching handle, and a lead-through-teach enabling switch provided on the main body.

When the lead-through-teach enabling switch is made effective and the deadman switch is operated by the operator, the brake switching signal output means outputs a signal for setting the mechanical brake ineffective and the servo on/off switching means turns on the power supply to the servo control unit. When the lead-through-teach enabling switch is turned effective and the deadman switch is not operated by the operator, the brake switching signal output means does not output the signal for setting the mechanical brake ineffective and the servo on/off switching means turns off the power supply to the servo control unit.

In a preferred embodiment of the present invention, the brake switching signal output means includes a first normally-open contact means connected in parallel to the lead-through-teach enabling switch, and first contact switching means for closing the first normally-open contact means only when the deadman switch is operated. The brake switching signal output means outputs the signal for setting the mechanical brake ineffective only when at least one of the lead-through-teach enabling switch and the first normally-open contact means is closed.

The servo on/off switching means may comprise second normally-open contact means provided between the servo control unit and the power source, and second contact switching means for closing the second normally-open contact means only when at least one of the lead-through-teach enabling switch and the first normally-open contact means is closed.

Electromagnetic relays for switching the first and second normally-open contacts are adopted as the first and second contact switching means, respectively.

The operator can set the robot controller to lead-through-teach mode by depressing to open the lead-through-teach enabling switch provided on the operation panel. In the lead-through-teach mode, the operator can move the robot by holding the teaching handle only when he or she is depressing the deadman switch provided on the teaching handle. Specifically, while the deadman switch is depressed, the servo control unit is kept on, and a torque command of the servo control unit is set to zero by software processing to thereby render the mechanical and dynamic brakes ineffective.

When the deadman switch provided on the teaching handle is not depressed in the lead-through-teach mode, the servo control unit is turned off, and the mechanical and dynamic brakes are set effective.

Thus, even when the robot begins to make an unexpected motion during the lead-through-teaching while the deadman switch depressed by the operator, the operator can immediately stop the robot without fail by releasing the deadman switch, thereby preventing danger. Also, when the deadman switch is released, the mechanical and dynamic brakes are immediately set effective, so that, even in the case of a robot having a gravity-imbalanced structure, the robot arm would never incline downward due to gravity.

BEST MODE FOR CARRYING OUT THE INVENTION

Figure 2:
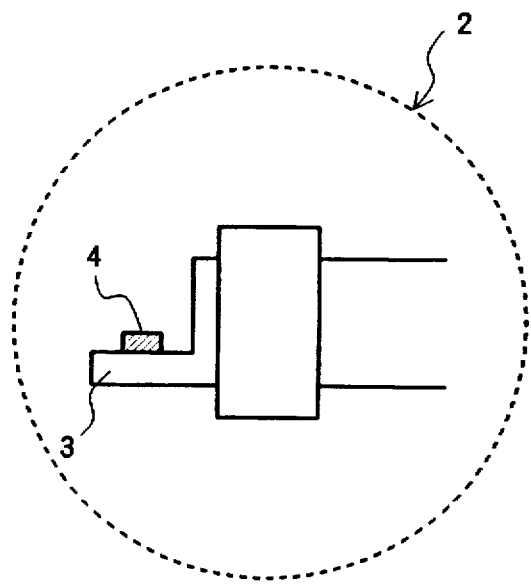
FIG. 2 is an enlarged view of a hand portion of the robot as shown in FIG. 1.
Figure 1:
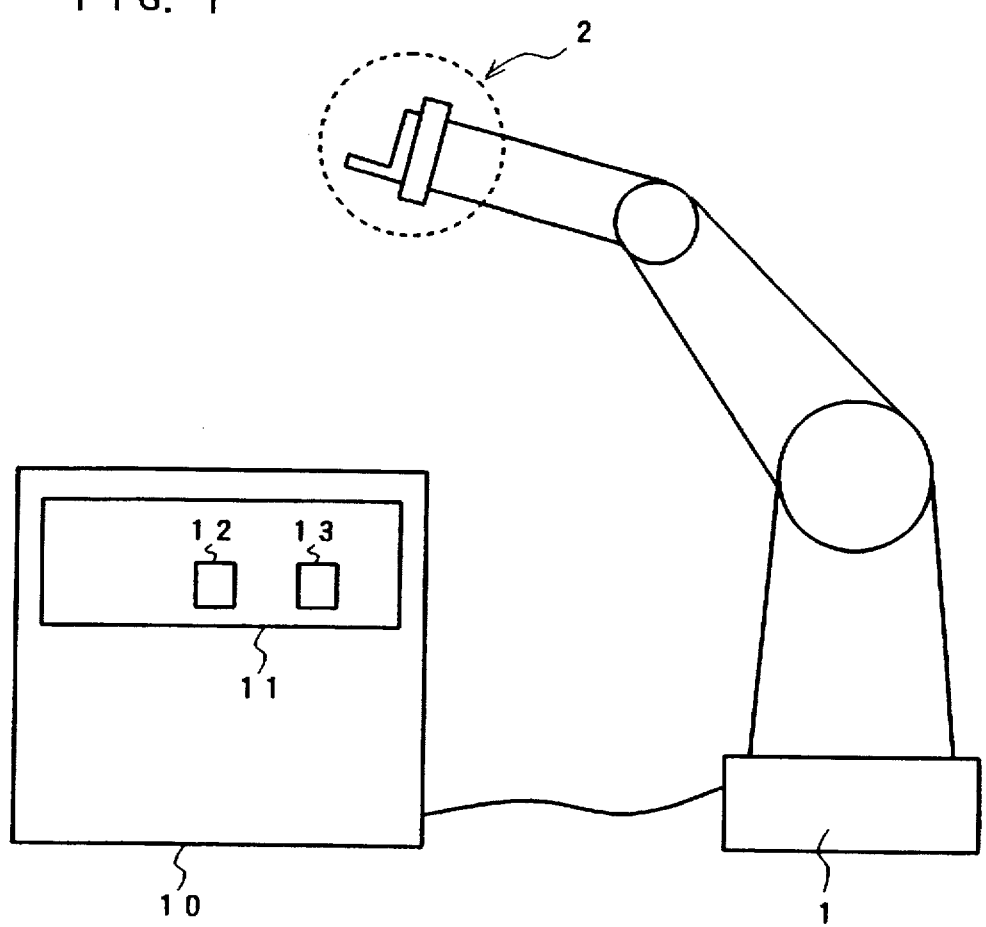
FIG. 1 is a schematic diagram illustrating a robot controller according to an embodiment of the present invention and a robot to be controlled by the control apparatus.

Referring to FIGS. 1 and 2, a general structure of a robot controller and a robot according to an embodiment of the present invention will be described. A robot 1 has a plurality of arms and a hand portion 2 mounted on an distal end of the arms. A teaching handle 3 for carrying out the lead-through-teaching is attached to the hand portion 2. On the teaching handle 3, a deadman switch 4 is provided at a suitable location at which the deadman switch 4 can be depressed naturally by an operator when the operator holds the teaching handle 3 to perform the lead-through-teaching (see FIG. 2). The deadman switch 4 constitutes a part of a robot control circuit with a main body 10 of a robot controller connected to the robot 1. Axes arrangement and form of the robot 1 are arbitrary and it is not necessary that the robot 1 have a balanced structure with respect to gravity.

The main body 10 of the robot controller connected to the robot 1 has arrangement and function similar to a conventional one, except for the improvement according to the present invention. Specifically, the robot controller body 10 contains a CPU for general control, a ROM and a RAM for storing program data, etc., axis controllers including servo amplifiers for driving respective robot axes, a servo control unit connected to the axis controllers, an interface for the input/output of external signals.

An operation panel section 11 of the robot controller body 10 is provided with various switches including a lead-through-teach enabling switch 12 and an emergency stop switch 13. The switches 12 and 13 are incorporated into a lead-through-teach control circuit as described below, together with the deadman switch 4 disposed on the teaching handle 3.

Figure 3:
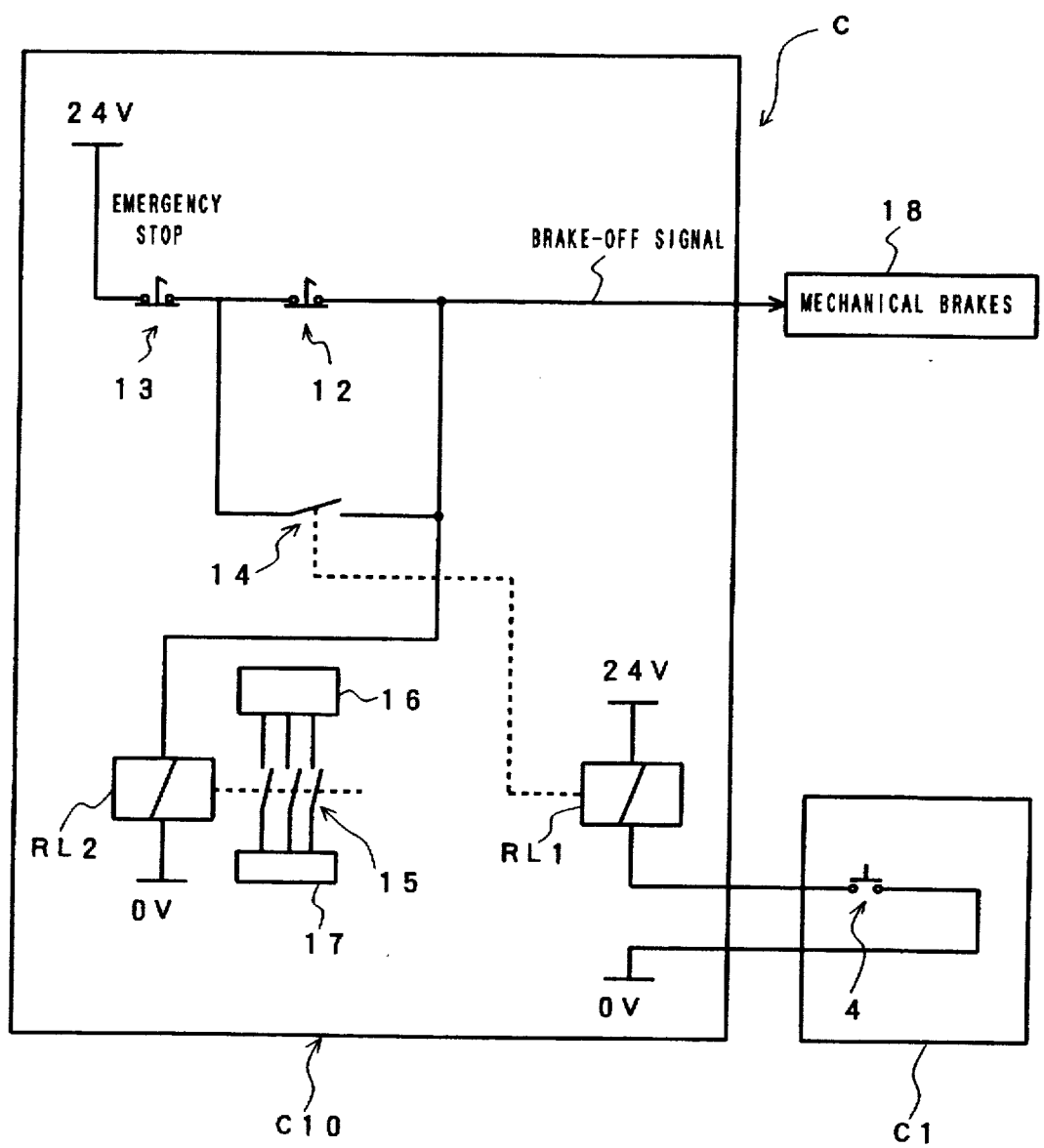
FIG. 3 is a block diagram schematically showing a control circuit relating to the lead-through teaching.

FIG. 3 schematically shows the control circuit for carrying out the lead-through-teaching.

A lead-through-teach control circuit C comprises a circuit section C1 provided in the teaching handle 3 of the robot 1 as shown in FIG. 1 and a circuit section C10 provided in the main body 10 of the robot controller. The deadman switch 4 included in the circuit section C1 is a return-type switch for actuating a normally-open contact. The normally-open contact is closed only when the deadman switch 4 is depressed and returns to an open state as soon as the deadman switch 4 is released from depression.

One of the contacts of the deadman switch 4 is grounded in the circuit section C10 and the other is connected to one terminal of an electromagnetic relay RL1, the other terminal of which is connected to a 24 V power source. The electromagnetic relay RL1 performs on/off control of a normally-open contact 14 connected in parallel with the lead-through-teach enabling switch 12. The contact 14 is closed only when the electromagnetic relay RL1 is energized with the electric current supplied.

The emergency stop switch 13 is connected between the 24 V power source and one terminal of a parallel circuit including the lead-through-teach enabling switch 12 and the contact 14. The emergency stop switch 13 is a holding-type switch whose contact is opened when depressed, and the open state is held until the switch 13 is pulled up. The lead-through-teach enabling switch 12 is also a holding-type switch whose contact is opened when depressed, and the open state is held until the switch 12 is pulled up.

The other terminal of the parallel circuit including the lead-through-teach enabling switch 12 and the contact 14 is connected to an ungrounded terminal of an electromagnetic relay RL2. The electromagnetic relay RL2 performs on/off control of a normally-open contact 15 which makes and breaks the connection between a power supply section 16 and a servo control unit 17 including servo amplifiers for actuating the respective axes of the robot. The normally-open contact 15 is closed only when the lead-through-teach enabling switch 12 is closed or when the electromagnetic relay RL1 is energized to close the normally-open contact 14, and the contact 15 remains open while both the switch 12 and the contact 14 are open.

The terminal of the parallel circuit including the lead-through-teach enabling switch 12 and the contact 14, which is connected to the electromagnetic relay RL2, also serves as an output terminal for outputting a brake-off signal to mechanical brakes 18. When this terminal is applied with a voltage of 24 V, the brake-off signal is supplied to the mechanical brakes 18, thereby rendering it ineffective.

The followings are description on the operating procedure to be performed by an operator and the operation of the circuit in carrying out lead-through-teaching using the robot controller as described above.

Before starting the lead-through-teaching, the contact of the deadman switch 4 is open. Therefore, the electromagnetic relay RL1 is not energized, and the normally-open contact 14 remains open. The contact of the lead-through-teach enabling switch 12 and the contact of the emergency stop switch 13 are closed. Accordingly, the electromagnetic relay RL2 is energized and thus the normally-open contact 15 is closed, whereby the servo control unit 17 is switched ON. In this state, since a brake-off signal is outputted, the mechanical brakes 18 are rendered ineffective. During this state, the robot will not move and its arms would not decline downward unless a move command is output to the servo control unit 17.

When the operator depresses the lead-through-teach enabling switch 12 on the operation panel 11 to start lead-through-teaching, the electromagnetic relay RL2 is not energized to cause the contact 15 to open, so that the servo control unit 17 is turned off, and dynamic brakes are automatically set effective. Simultaneously, the output of the brake-off signal stops, and thus the mechanical brakes 18 are set effective. Consequently, the robot is locked at its current position.

Subsequently, when the operator holds the teaching handle 3 and depresses the deadman switch 4, the electromagnetic relay RL1 is energized to cause the normally-open contact 14 to be closed. As a result, a brake-off signal is output to make the mechanical brakes 18 ineffective. Simultaneously, the electromagnetic relay RL2 is energized to cause normally-open contact 15 to be closed, whereby the servo control unit is turned on, rendering the dynamic brakes ineffective. Further, a signal for setting a torque command to zero is outputted to the CPU of the servo control unit 17 via the interface of an non-illustrated separate system.

When the operator holds the teaching handle 3 with the deadman switch 4 depressed, and applies an external force to the handle 3 in a desired direction (either push or pull), the hand portion 2 of the robot 1 is moved to a desired position. Since the mechanical brakes 18 have been set ineffective and also the dynamic brakes are not operative, no large force is required to move the robot arm.

If the operator desires to discontinue the lead-through-teaching, he or she has only to stop depressing the deadman switch 4. When the depression of the deadman switch 4 is discontinued, the electromagnetic relay RL1 is unenergized to cause the normally-open contact 14 to open, so that the output of the brake-off signal stops to make the mechanical brakes 18 effective. Simultaneously, the electromagnetic relay RL2 is unenergized to cause the normally-open contact 15 to open, thereby the servo control unit is switched off, making the dynamic brakes active. Accordingly, the robot 1 is locked immediately at its current position, so that the robot can be prevented from moving unexpectedly or the robot arm can be prevented from moving largely downward due to gravity when the lead-through-teach operation is interrupted.

When the lead-through-teaching operation is finished, the operator pulls up the lead-through-teach enabling switch 12 on the operation panel 11, thereby the robot returns to the same state as that before the lead-through-teach operation is started. Specifically, the electromagnetic relay RL2 is supplied with electric current and energized; therefore, the contact 15 is closed and the servo control unit is turned on. Simultaneously, the brake-off signal is outputted and the mechanical brakes 18 are rendered ineffective. Meanwhile, when the emergency stop switch 13 is operated, the servo control unit is unconditionally turned off, whereby the mechanical brakes 18 are set effective, causing the robot to be locked.

In the event the robot begins to move unexpectedly due to erroneous operation or the like of the servo control unit during the lead-through-teaching (in the event the operator feels strong resistance when moving the hand portion 2 while depressing the deadman switch 4), the operator has only to stop depressing the deadman switch 4 by releasing his or her hand from the teaching handle 3, whereupon the servo control unit is immediately turned off, making the dynamic brakes operative, and the mechanical brakes 18 are set effective, thereby locking the robot. Accordingly, even if the servo control unit operates erroneously, the motion of the robot 1 is stopped without fail before a serious accident occurs.

According to the robot controller of the present invention, the lead-through-teaching is easily performed with the ensured safety of the operator using a simple control circuit. Even for the robot having a gravity-imbalanced structure, the lead-through teaching is performed without worrying about the robot arm largely inclining downward.

We claim:

1. A robot controller for permitting an operator to perform lead-through teaching for a robot having a mechanical brake provided in respective robot axis and a hand portion, using a teaching handle mounted on the hand portion, said apparatus comprising:

a main body having a servo control unit for controlling said respective robot axis, and a power source for supplying electric power to said servo control unit; and a lead-through-teach control circuit, said lead-through teach control circuit including servo on/off switching means for switching on and off the power supply from said power source to said servo control unit, brake switching signal output means for outputting a signal for switching said mechanical brake to be effective/ineffective, a deadman switch provided on said teaching handle, and a lead-through-teach enabling switch provided on said main body, wherein said brake switching signal output means outputs a signal for setting said mechanical brake ineffective and said servo on/off switching means turns on the power supply to said servo control unit when said lead-through-teach enabling switch is turned effective, and said deadman switch is operated by the operator, and said brake switching signal output means does not output the signal for setting said mechanical brake ineffective and said servo on/off switching means turns off the power supply to said servo control unit when said lead-through-teach enabling switch is turned effective and said deadman switch is not operated by the operator.

2. The robot controller according to claim 1, wherein said brake switching signal output means comprises first normally-open contact means connected in parallel to said lead-through-teach enabling switch, and first contact switching means for closing the first normally-open contact means only when said deadman switch is operated, said brake switching signal output means outputting the signal for setting said mechanical brake ineffective only when at least one of said lead-through-teach enabling switch and said first normally-open contact means is closed, and said servo on/off switching means comprises second normally-open contact means provided between said servo control unit and said power source, and second contact switching means for closing said second normally-open contact means only when at least one of said lead-through-teach enabling switch and said first normally-open contact means is closed.

3. The robot controller according to claim 1, wherein said brake switching signal output means comprises first normally-open contact means connected in parallel to said lead-through-teach enabling switch, and first electromagnetic relay means for closing said first normally-open contact means only when said deadman switch is operated, said brake switching signal output means outputting the signal for setting said mechanical brake ineffective only when at least one of said lead-through-teach enabling switch and said first normally-open contact means is closed, and said servo on/off switching means comprises second normally-open contact means provided between said servo control unit and said power source, and second electromagnetic relay means for closing said second normally-open contact means only when at least one of said lead-through-teach enabling switch and said first normally-open contact means is closed.

* * * * *